US012744771B2

(12) United States Patent
Bornheimer

(10) Patent No.: US 12,744,771 B2
(45) Date of Patent: Sep. 22, 2026

(54) METHODS AND SYSTEM TO PREVENT CREDENTIAL PIRACY

(71) Applicant: Zachary Bornheimer, Tampa, FL (US)

(72) Inventor: Zachary Bornheimer, Tampa, FL (US)

( * ) Notice: Subject to any disclaimer, the term of this patent is extended or adjusted under 35 U.S.C. 154(b) by 365 days.

(21) Appl. No.: 18/143,334

(22) Filed: May 4, 2023

(65) Prior Publication Data

US 2023/0362155 A1 Nov. 9, 2023

Related U.S. Application Data

(60) Provisional application No. 63/339,212, filed on May 6, 2022.

(51) Int. Cl.
*H04L 9/40* (2022.01)

(52) U.S. Cl.
CPC .......... *H04L 63/083* (2013.01); *H04L 63/102* (2013.01)

(58) Field of Classification Search
CPC ............................ H04L 63/083; H04L 63/102
USPC .............................................................. 726/4
See application file for complete search history.

(56) References Cited

U.S. PATENT DOCUMENTS 10,414,344 B1 * 9/2019 Northcott ................ B60R 16/00
2003/0048906 A1 * 3/2003 Vora ........................ H04L 9/085 380/277
2013/0247161 A1 * 9/2013 Bajko ................... H04L 9/3268 726/7
2014/0289825 A1 * 9/2014 Chan ..................... H04W 12/06 726/5
2015/0135286 A1 * 5/2015 Egan ................... H04L 63/0884 726/5
2015/0365416 A1 * 12/2015 Narayanan .............. H04L 63/10 726/27

(Continued)

FOREIGN PATENT DOCUMENTS

CN 101783803 A * 7/2010
CN 111835514 A * 10/2020

(Continued)

OTHER PUBLICATIONS

Deshotels, Luke, Costin Carabas, Jordan Beichler, Rzvan Deaconescu, and William Enck. "Kobold: Evaluating decentralized access control for remote nsxpc methods on iOS." In 2020 IEEE Symposium on Security and Privacy (SP), pp. 1056-1070. IEEE, 2020. (Year: 2020).*

(Continued)

*Primary Examiner* — Luu T Pham
*Assistant Examiner* — Walter J Malinowski
(74) *Attorney, Agent, or Firm* — Millen, White, Zelano & Branigan P.C.; William F. Nixon

(57) ABSTRACT

Methods and system are implemented to mitigate the chance of credential piracy within a content providing system. The content providing system allows access to the content on its platform to multiple, licensed devices activated for an account. The content platform uses an authentication engine to manage the device information and detect unauthorized access to the content platform. Each device submits credentials typically in the form of a user name or email, a password, and a random string generated at the device. The random string is used to track activated devices and to determine when a possible piracy action is occurring.

13 Claims, 6 Drawing Sheets

(56) References Cited

U.S. PATENT DOCUMENTS

| | | | | |
|---|---|---|---|---|
| 2016/0007142 | A1* | 1/2016 | Anderson | H04W 76/10 455/41.1 |
| 2016/0140618 | A1* | 5/2016 | Duggal | G06Q 30/0269 705/14.66 |
| 2017/0124303 | A1 | 5/2017 | Baldwin et al. | |
| 2017/0302656 | A1 | 10/2017 | Ramatchandirane | |
| 2018/0109966 | A1* | 4/2018 | Alexander | H04L 45/22 |
| 2018/0150647 | A1* | 5/2018 | Naqvi | H04L 9/321 |
| 2019/0075130 | A1 | 3/2019 | Petry et al. | |
| 2020/0036693 | A1 | 1/2020 | Huynh | |
| 2020/0167553 | A1* | 5/2020 | Abghari | G06N 5/04 |
| 2020/0184568 | A1* | 6/2020 | Bornheimer | G06Q 40/08 |
| 2022/0382908 | A1* | 12/2022 | Buddhavarapu | G06F 21/6263 |
| 2023/0254288 | A1* | 8/2023 | Nair | H04L 63/0281 726/6 |

FOREIGN PATENT DOCUMENTS

| | | | | |
|---|---|---|---|---|
| JP | 3744358 | B2 * | 2/2006 | G07F 17/0014 |
| JP | 2010009356 | A * | 1/2010 | |
| WO | WO-2013091068 | A1 * | 6/2013 | H04L 67/306 |

OTHER PUBLICATIONS

Chow. Chapter 7. Solutions to the Problem. The Death of the Internet. First Edition, John Wiley & Sons. pp. 245-329, 2012. (Year: 2012).*

Blue, Juanita, Eoghan Furey, and Joan Condell. "A novel approach for secure identity authentication in legacy database systems." In 2017 28th Irish Signals and Systems Conference (ISSC), pp. 1-6. IEEE, 2017. (Year: 2017).*

International Search Report PCT/US2023/21143 dated Oct. 10, 2023 (pp. 1-3).

* cited by examiner

100
Customer
108
First Device
114
Authentication Credentials
109
User Name/ Registered Email
110
Password
112
Random String
113
Second Device
124
Third Device
126
Fourth Device
128
Random String
113
Random String
113
Random String
113
Network
102
Content Platform
103
Authentication Engine
118
Account
116
Authentication Token
120
Random String Database Table
122
User Name/ Registered Email
110
Password
112
Content
106

300

302
Perform New Installation
304
Generate Random String
306
Asssign Active Status
308
Provide Credentials to Authentication Engine
310
Store in Table
312
Check Existing Random Strings
314
Max. ?
No
Yes
316
Check Status for Each Random String
320
Do Nothing
318
Active ?
No
Yes
322
Mark as Unknown

400

402
Receive Credentials
404
Identify Random String
406
New
?
Yes
Perform Activation
Process
408
No
422
410
Check Status
Return to Step 402
No
412
420
No
Unknown
?
Inactive
?
Yes
Yes
414
Change to Active
Send Warning
424
Lock Account
426
416
Max.
?
Yes
Change Unkown
Status to Inactive
418
No

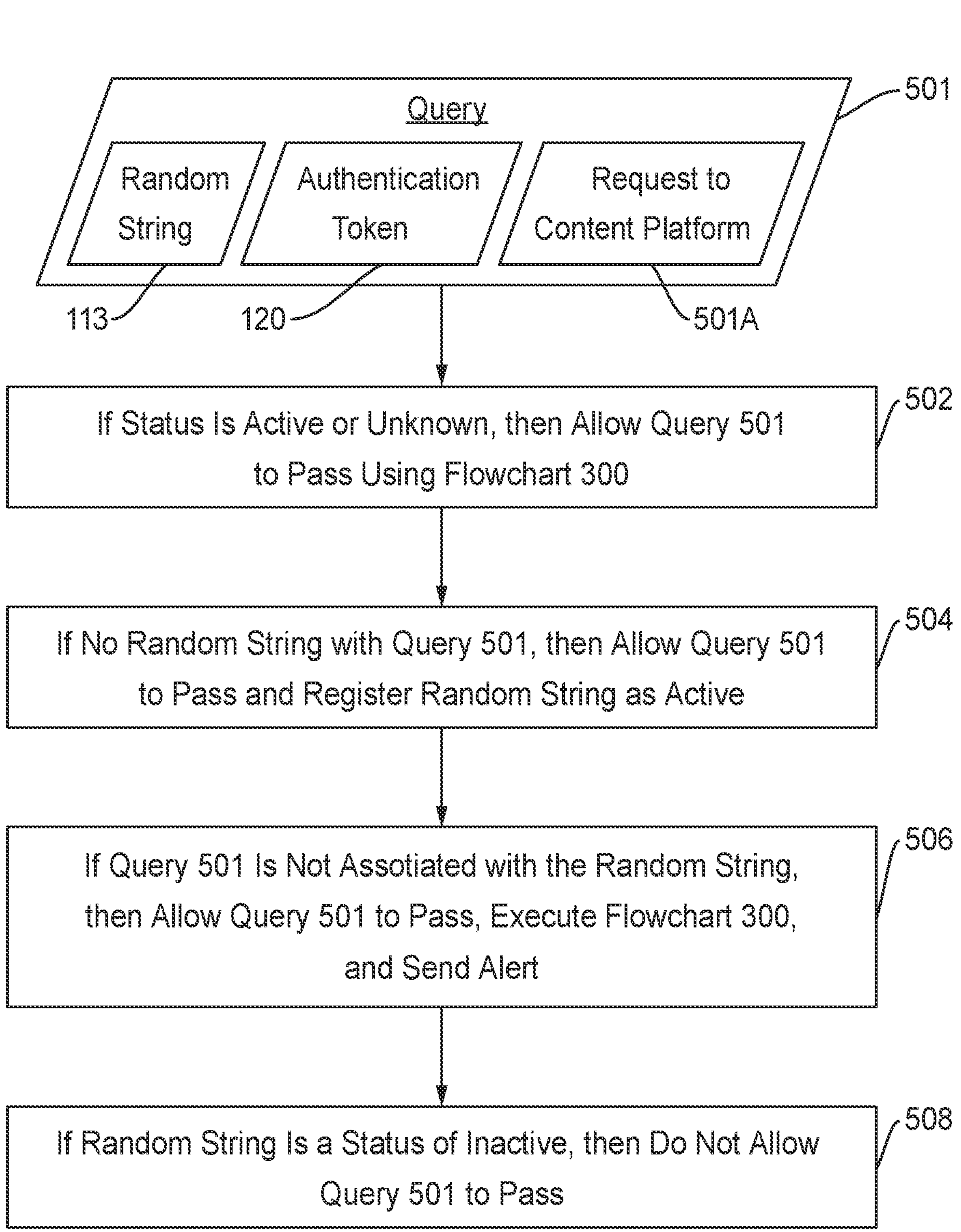
500
Fig. 5
Query
Random String
Authentication Token
Request to Content Platform
501
113
120
501A
If Status Is Active or Unknown, then Allow Query 501 to Pass Using Flowchart 300
502
If No Random String with Query 501, then Allow Query 501 to Pass and Register Random String as Active
504
If Query 501 Is Not Assotiated with the Random String, then Allow Query 501 to Pass, Execute Flowchart 300, and Send Alert
506
If Random String Is a Status of Inactive, then Do Not Allow Query 501 to Pass
508

600

602
Check Random String
604
Active
?
Yes
Do Nothing
606
No
608
Inactive
?
Yes
Deactivate Software
610
No
612
Execute Flowchart 300

METHODS AND SYSTEM TO PREVENT CREDENTIAL PIRACY

FIELD OF THE INVENTION

The present invention relates to a computer platform and associated methods for preventing the piracy of credentials using an on-line platform.

DESCRIPTION OF THE RELATED ART

Many online or content-provider platforms use the same process to authorize access to their content or platforms. This process implements a public-private information split where one piece of information is public, most often a user name/email address, and one piece is private, often a password. This information may be used by a customer on different devices or in different locations. In some instances, the customer shares the password with others so to enable them to access content without paying an extra fee. To prevent this, some content providers try to limit the use of passwords between different devices or to one location. This solution, however, is not convenient for customers that use several devices to access the content or spend a lot of time in different locations. Further, these solutions depend on tracking user names and passwords, which may be compromised during hacks and data breaches.

SUMMARY OF THE INVENTION

A method for authenticating a device to access a content platform is disclosed. The method includes receiving credentials at a licensing engine from a device connected to the content platform over a network. The credentials include a user name and a password for an account, an authentication token corresponding to the account, and an authentication token generated at the device known as the random string. The method also includes checking a random string database table for the random string. The method also includes determining a status for the random string using the random string database table. The method also includes taking an action for activating the device to access the content platform based on the determination using the random string.

A method for detecting unauthorized usage of valid credentials at a content platform is disclosed. The method includes determining that a maximum activation number is reached for active devices accessing the content platform using at least two random strings for each of the active devices. The at least two random strings are listed in a random string database table at the content platform. The method also includes changing a status for a subset of the account's associated random strings from active to unknown in the random string database table. The method also includes a sequential activation of random strings until the maximum activation number is reached. The method also includes a conversion from unknown to inactive for all unknown random strings after the total activated count reaches the maximum activation number. The method also includes matching a subsequent random string to one of the subset of the at least one random string having the inactive status. The method also includes denying access to the content platform for the device corresponding to the subsequent random string.

A content provider providing contents to be used or viewed by at least one user is further disclosed. The content provider includes a content platform receiving credentials from a device connected to the content platform over a network, wherein the device is associated with a user account, and the credentials include authentication components such as a user name and a password for the user account and a random string generated at the device, a database storing the user name, the password, and a random string database table having the random string for the user account, a content database storing the contents to be sent to the at least one user, one or more processors, and a memory coupled to the one or more processors, the memory including computer-readable instructions. When the computer-readable instructions are executed, the instructions cause the one or more processor to authenticate the credentials received from the device to determine if the user name and password match with those saved in the database, checking the random string database table for the random string, if the random string has been stored in the random string database table, determining a status of the device, and taking an action for activating the device to access the content platform based on the determination using the random string.

BRIEF DESCRIPTION OF THE DRAWINGS

Various other features and attendant advantages of the present invention will be more fully appreciated as the same becomes better understood when considered in conjunction with the accompanying drawings.

FIG. 5 illustrates a flowchart for a random string check during a normal query run according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

Piracy mitigation continues to plague online content providers, such as streaming services. A customer may provide a user name and password to family members and friends in order to avoid paying extra fees or engaging in a new subscription. Further, some companies may share credentials, such as the user name or password, "accidentally" between employees. It also is convenient to provide this information to avoid numerous accounts with different credentials. In other words, everyone knows the password so there is no need to track different passwords for each user. Further, not everyone is computer-savvy enough to set up separate accounts so it is easier to just use an established account to access content.

The disclosed embodiments provide a license system to prevent the "accidental" sharing of credentials with family/friends, team members, employees, downline agents, and the like. The disclosed embodiments allow for activations without the customer keeping the credentials secret being relevant.

Figure 1:
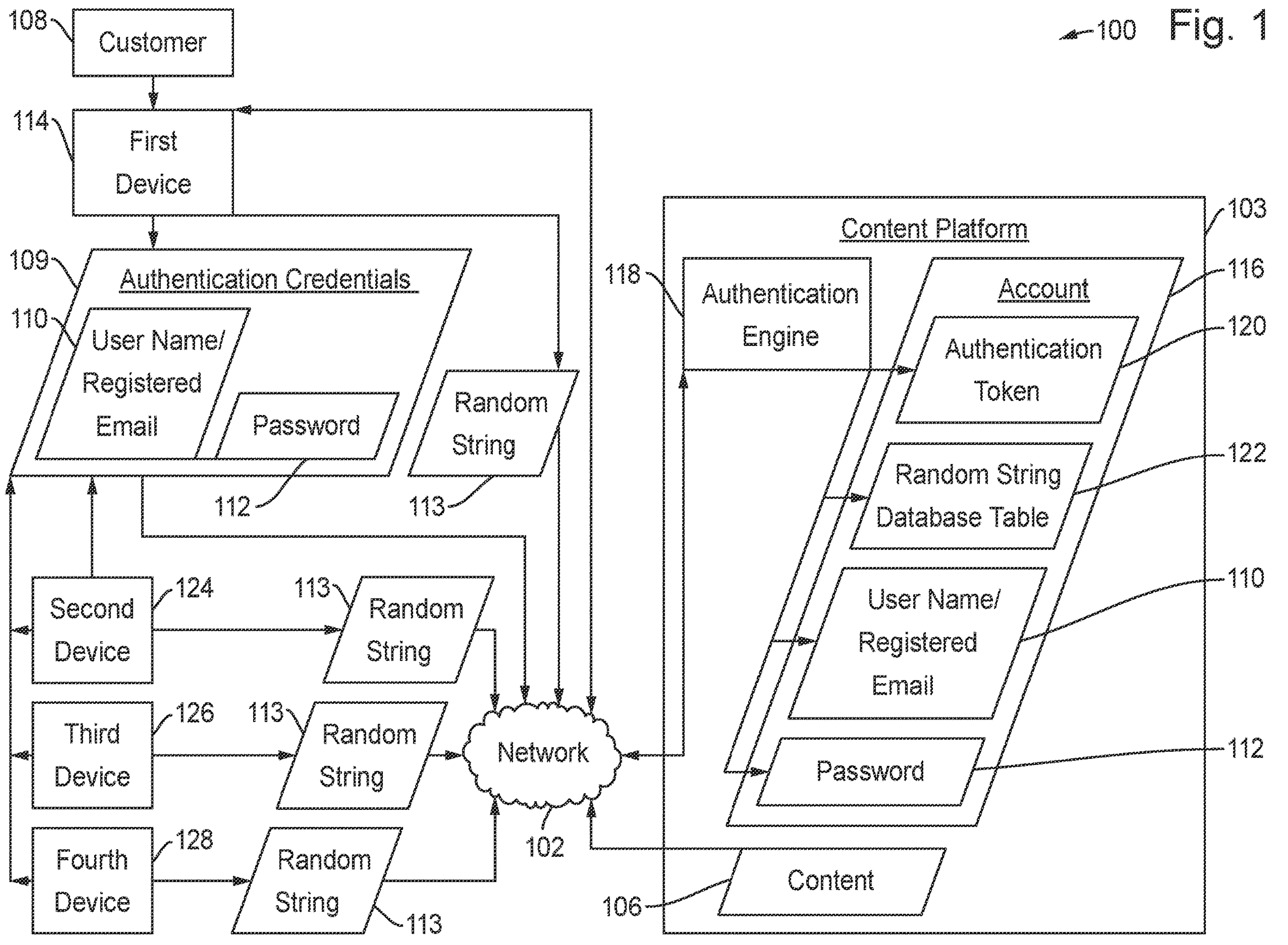
FIG. 1 illustrates a system for mitigating piracy of credentials according to the disclosed embodiments.

FIG. 1 depicts a system 100 for mitigating piracy of credentials according to the disclosed embodiments. System 100 implements network 102 to exchange data and content to devices connected thereto. Content platform 103 provides content 106 to connected devices that are authorized to receive the content. Content 106 may include digital content that is streamed to the devices for customer 108 to view or with which to interact, such as a game or social media platform. Content 106 also may include business or personal documents for use by customer 108. Content platform 103 is supported by a content provider. Therefore, in the following descriptions, content platform 103 is also referred as content provider 103.

During the purchase process, customer 108 provides user name/registered email 110 (hereinafter "user name") along with a password 112 to uniquely identify the user name as belonging to customer 108 when accessing content platform 103. User name 110 and password 112 may be provided through network 102 to content platform 103 using first device 114. User name 110 and password 112 may be the entirety or a subset of authentication credentials 109. Content platform 103 creates an account 116 corresponding to customer 108. Using authentication engine 118, content platform 103 generates authentication token 120 informed by authentication credential 109 during the account activation or purchase process for account 116. Authentication token 120 may be stored in the software settings for customer 108 in applicable devices as well as account 116. Authentication token 120 may be sent via content platform 103 during its API calls.

Authentication token 120 is a representation of a single active subscription or account. Authentication token 120 may use a random character sequence to identify an authenticated session, a mathematical formula culminating in a sequence of alphanumeric characters, or any other process to represent an active subscription or account. Content platform 103 checks to ensure that the authentication token 120 for account 116 is valid using authentication engine 118.

System 100 may allow a single customer 108 to access content platform 103 with multiple devices at the same time or at different times using the same user name/registered email 110 along with password 102. For example, a single customer 108 is allowed to access content platform 103 with four different devices; and in some cases, in particular, customer 108 is allowed to share his/her login information with three of his/her family members or authorized members to access content platform 103 with four different devices at the same time. In this case, account 116 associated with this customer may include four random strings 113, each of which associated with a device that is registered and legible of accessing content platform 103. In the disclosed embodiment of FIG. 1, these devices includes first, second, third, and fourth devices 114, 124, 126, and 128.

Each device that connects to the content platform is required to generate a random string of characters, or random string, 113. Examples of random strings are disclosed below. The content platform 103 generates a random string database table 122. When each device connects to the authentication engine 118, it stores the random string into random string database table 122 which allows the authentication engine to decide if it should authorize access to the content platform for a particular device if that device supplies a valid authentication token 120. This feature differs from the process where each activation and deactivation has to go through an opaque device registration process after authenticated credentials are provided on an unrecognized device.

If the device is not recognized, then a problem may exist for people who would clear their cache for online access to content platform 103 or use a different web browser. Because they did not log that the device or software is deactivated with that registration authority, the server may think that they were trying to activate a new copy of any software and would block access. Or, during travel, that same registration authority may believe that there is unauthorized access due to geolocation changes. Or the authentication server may force a new opaque device registration which would prevent access to the content platform until the device is registered, a technique commonly used with banks and other financial platforms.

Random string database table 122 includes random strings which are a secret key. A random string acts like a tracking agent for each device that logs onto content platform 103. The random string is checked both during a periodic authentication check, executed using FIG. 6, and during regular access to content platform 103. As disclosed below, if the random string appears in random string database table 122, then content platform 103 determines that the device has been activated before. If the random string does not appear in random string database table 122, then content platform 103 determines that the device has not been activated. During first access to a content platform, like during the installation and first launch of offline-use software, authentication engine 118 may generate a new random string.

As noted above, customer 108 may use more than one device to access content platform 103. Thus, system 100 may include second device 124, third device 126, and fourth device 128. Devices 114, 124, 126, and 128 allow access to content platform 103 so that customer 108 can access content 106. The devices may be in different locations to connect to network 102. Further, the devices may be different make and models as well as have different IP addresses within system 100.

The disclosed embodiments may track access by customer 108 on devices 114, 124, 126, and 128 to make sure that the customer is behaving according to the terms of use associated with account 116. In other words, to access all the devices, account 116 should indicate that customer 108 subscribed with access for all connected devices. The disclosed embodiments also determine if customer 108 attempts to access content platform 103 from an unauthorized device, or one that exceeds to number of devices allowed to connect to content platform 103 according to the terms of use for account 116.

For example, customer 108 may travel to a different geographic area and try to access content platform 103 through a fifth device that has not been registered or recognized by content platform 103. In this case, content platform 103 would determine if the fifth device is an allowable device by analyzing login information entered by customer 108. If customer 108 is allowed to access content platform 103 through a maximum of three devices, content platform or provider 103 would determine whether the maximum number of accessing devices has reached at the time the fifth device is logged in. If less than three devices are activated at the time the fifth device is logged in, content platform 103 would activate the fifth device and save a new random string generated by the fifth device to random string database 122. However, if three devices associated with this customer's account are all activated, that is, they are still in login statuses, content platform 103 would not allow the customer to use the fifth device to access content platform 103. In an alternative embodiment, content platform 103 may automatically deactivate one of the three devices and activate the fifth device, and save the random string generated by the fifth device in random string database 122. Details of these embodiments are disclosed below in FIGS. 3-6.

Figure 2:
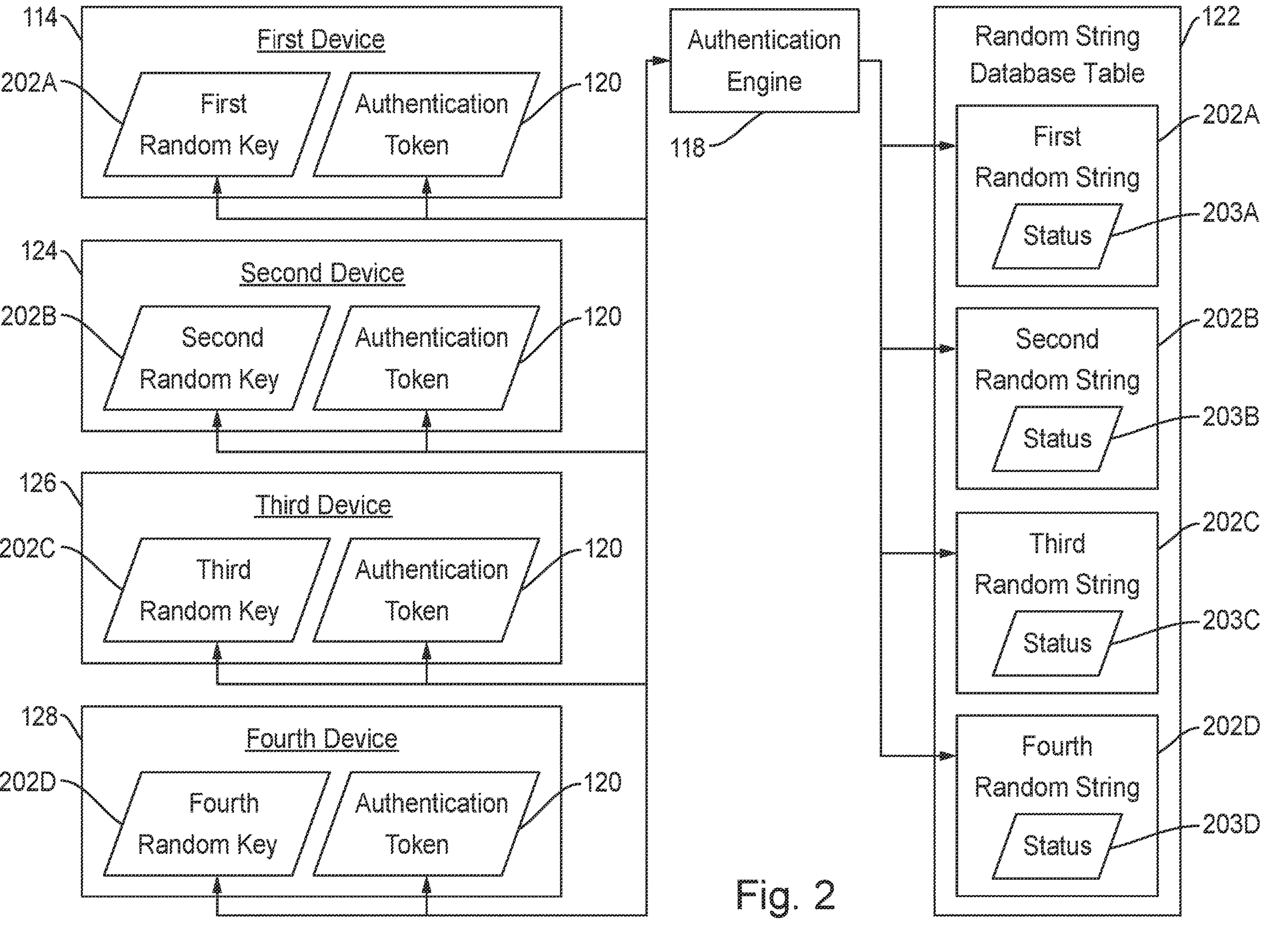
FIG. 2 illustrates the use of random strings for device status according to the disclosed embodiments.

FIG. 2 depicts the use of random strings for device status according to the disclosed embodiments. In FIG. 2, random string database table 122 includes random strings 202A, 202B, 202C, and 202D. Random strings 113 may correspond to random string 113. Each random string matches a corresponding random string on activated devices within the license for account 116.

For example, when a device is used to access content platform 103 for the first time, the device or an application installed in the device may generate a random string that is sent with authentication token 120 to content platform 103 to authorize the device to access content 106 on the platform.

When opening a fresh installation on a device, the associated application generates a new random string. Thus, the application on first device 114 generates first random string 202A. When first device 114 accesses content platform 103, authentication engine 118 will utilize an authentication protocol to determine if authentication token 120 is valid and corresponds to the authentication credentials 109 for account 116. Further, it will take first random string 122A and perform an activation procedure, disclosed in greater detail below. If authentication engine 118 determines that activation of first device 114 is allowed, then first random string 202A is stored in random string database table 122. First random string 202A will be assigned a status 203A. Status 203A may be inactive, active, or unknown.

This process is repeated from second device 124. A fresh installation of the application or a session for a browser will generate second random key 202B, which is provided to authentication engine 118 and placed in random string database table 122 with its status 203B. Third device 126 performs the same process and generates third random key 202C that is stored in random string database table 122 with status 203C. Fourth device 128 perform the same process and generates fourth random key 202D that is stored in random string database table 122 with status 203D.

Random string database table 122, therefore, includes four entries for devices that are accessing content 106 from content platform 103. Statuses 203A-D indicate whether associated devices are active or inactive. Each random string 202A-D may initially be assigned an active status, indicated with a 1. As new random strings are received by authentication engine 118 at content platform 103, the status of these strings may change depending on whether more than one person is utilizing a set of credentials, such as user name 110 and password 112. This process is disclosed in greater detail below.

Figure 3:
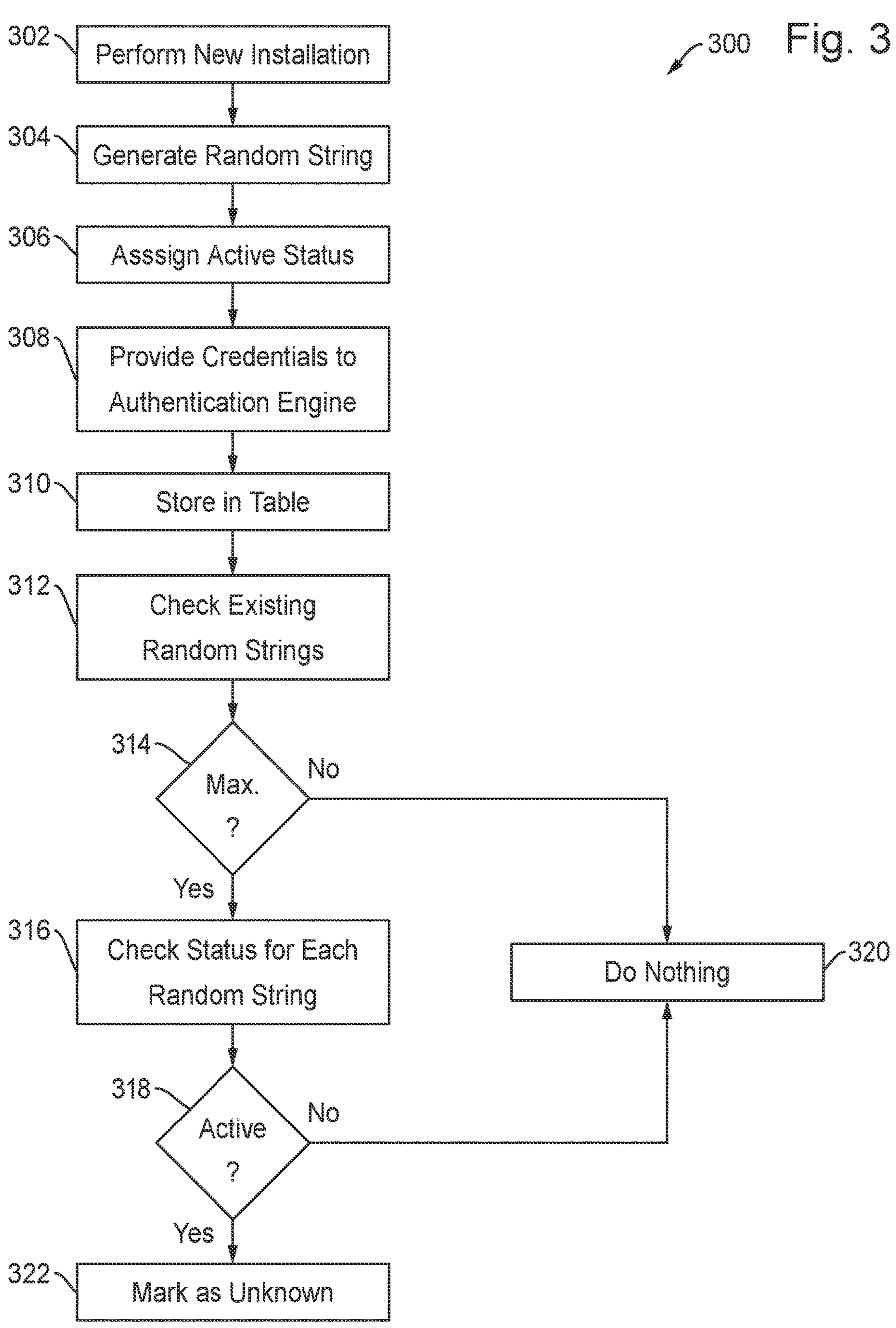
FIG. 3 illustrates a flowchart for an activation process for a device accessing a content platform according to the disclosed embodiments.

FIG. 3 depicts a flowchart 300 for an activation process for an unknown/new device accessing content platform 103 according to the disclosed embodiments. Flowchart 300 may refer to FIGS. 1 and 2 for illustrative purposes. Flowchart 300, however, is not limited to the embodiments disclosed by FIGS. 1 and 2.

Step 302 executes by performing a new installation of the application to access content platform 103 on a device. Alternatively, a new local machine installation may occur for a program on the device or access may be sought by a new browser. For example, customer 108 may be using a new application on an existing device that previously accessed content platform 103.

Step 304 executes by generating the random string at the device. Referring to FIG. 2, fourth device 128 installs a new application for content provider 103. Random string 202D is generated as a result. Step 306 executes by assigning an active status to random string 202D.

Step 308 executes by providing credentials for customer 108 to authentication engine 118 for access to content platform 103. Credentials may include authentication credentials 109, authentication token 120, and random strings 202D. Authentication engine 118 determines that the authentication token 120 corresponds to the authentication credentials 109 and that the content access request is coming from a new device, or fourth device 128. Step 310 executes by storing random string 202D in random string database table 122 with a status 203D of active, or 1.

Step 312 executes by checking existing random strings, if any, within random string database table 122. Specifically, authentication engine 118 may check to determine how many random strings in table 122 have a status of active, or 1. Random strings that have statuses of inactive, or 0, and unknown, or 2, may not be considered. Step 314 executes by determining if the number of random strings in random string database table 122 having an active status exceeds the number of maximum activations on the license for account 116.

For example, account 116 may allow three activations for customer 108. First device 114, second device 124, and third device 126 are already active within system 100 to access content platform 103. Status 203A of random string 202A associated with first device 114 indicates that it is active. Status 203B of random string 202B associated with second device 124 indicates that it is active. Status 203C of random string 202C associated with third device 126 indicates that it is active. The activation of fourth device 128 using fourth random string 202D and a status 203D of active would exceed the maximum activations for account 116.

If step 314 is no, then flowchart 300 proceeds to step 320 and does nothing to the existing random strings in random string database table 122. If step 314 is yes, then step 316 executes by checking status for each random string in random string access database 122. Step 318 executes by determining whether the status of each random string is active, or 1. If no, then step 320 is executed by doing nothing to the random string. The random string has a status of inactive or unknown and this status stays the same.

If step 318 is yes, then step 322 executes by marking the random string as having a status of unknown, or 2. Steps 316-322 may be repeated for each random string within table 122 associated with account 106. Using the example above, status 203D for fourth random string 202D is active while status 203A, status 203B, and status 203C are changed to unknown for first random string 202A, second random string 202B, and third random string 202C, respectively. The change in status helps track other devices as they are activated to determine how many active devices are being used by account 106 and if devices have been replaced.

In some embodiments, step 314 may be deleted so that the status for each random string currently within random string database table 122 is checked to determine if it is active. If the random string includes an active status, then its status is changed to unknown. As devices come back online, the disclosed embodiments then determine whether the maximum number of activations allowed for the license for account 116 is reached using the verification process disclosed below.

Figure 4:
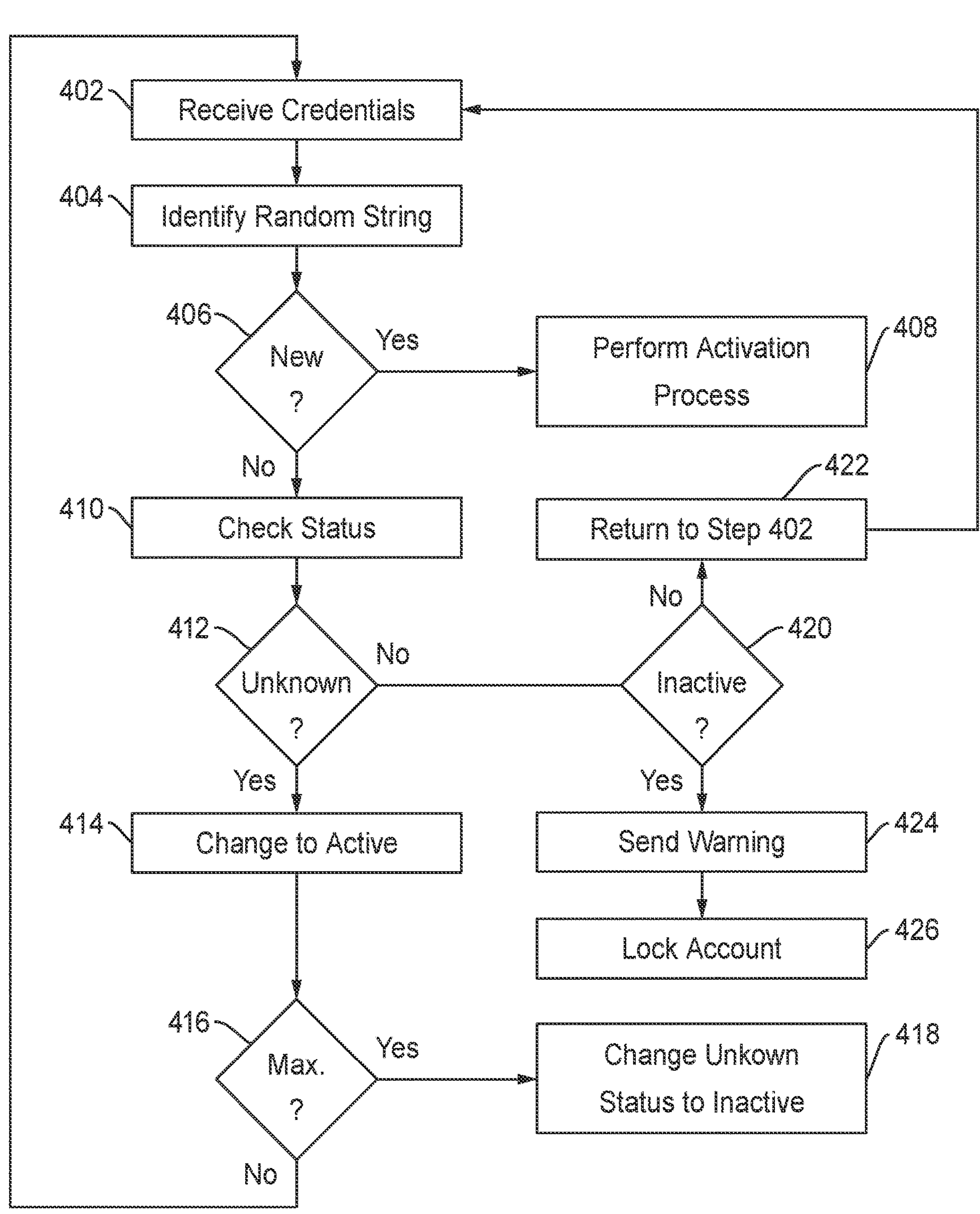
FIG. 4 illustrates for a verification process of devices accessing the content platform according to the disclosed embodiments.

FIG. 4 depicts flowchart 400 for a verification process of devices accessing content platform 103 according to the disclosed embodiments. Flowchart 400 may refer to FIGS. 1-3 for illustrative purposes. Flowchart 400, however, is not limited to the embodiments disclosed in FIGS. 1-3. Flowchart 400 may execute after a new device has been activated placing its random string in random string database table 122, or after execution of step 322 of flowchart 300. A period of time may pass after all random strings having a status of active are changed to a status of unknown. As those statuses indicate that the devices corresponding to the random strings are unknown, the verification process allows content platform 103 to confirm on a case by case basis that customer 108 is not pirating credentials to circumvent its license.

Step 402 executes by receiving credentials from a device connected to content platform 103 through network 102. As disclosed above, credentials include authentication credentials 109, authentication token 120, and a random string from the device. For example, third device 126 attempts to access content 106 on content platform 103. Thus, it submits its credentials as noted above including third random string 202C. From the example provided in Flowchart 300, after fourth device 128 was activated and the random strings 202A, 202B, 202C which correspond to the three devices 114, 124, and 126 respectively were converted to unknown. For illustrative purposes, consider third device 126 and its random string 202C which would have its status 203C set to unknown, or 2.

Step 404 executes by identifying the random string from the received authentication credentials 109. The random string is the only piece of data that differs from authentication credentials received from other devices. Using the above example, the disclosed embodiments identify third random string 202C as the random string. Step 406 executes by determining whether the received random string is new. Authentication engine 118 may check to see if random string 202C is stored within random string database table 122. If yes, then step 408 executes by performing the activation process disclosed by flowchart 300.

If step 406 is no, then step 410 executes by checking the status of the existing random string within random string database table 122. As disclosed above, the statuses of the random strings in random string database table 122 may change over time or due to the activation of new device to access content platform 103. The applicable statuses for the random strings is active, inactive, or unknown.

Step 412 executes by determining whether the status of the received random string for the activated device is unknown, or 2. An unknown status indicates that the associated device may be active or inactive and that the disclosed embodiments will not classify the status as either until some action is taken, such as providing its credentials in step 402. Using the above example, status 203C for third random string 202C is unknown.

If step 412 is yes, then step 414 executes by changing the status of the random string from unknown to active. This feature indicates that the associated device is still being used to access content 106 on content platform 103. Using the example above, status 203C of third random string 202C is changed from unknown to active, or from 2 to 1. Random string database table 122 is updated accordingly.

Step 416 executes by determining whether the maximum activations are reached for the license to account 116, as disclosed in step 314 in flowchart 300. If the maximum number of activations is reached, then step 418 executes by changing all statuses for all random strings currently having a status of unknown to inactive. Those devices associated with an inactive status will not be allowed to access content platform 103. For example, with a maximum activated device limit of 3 and if second device 124 and fourth device 128 had been activated, when third device 126 is activated, first device 114's status 203A for first random string 202A is unknown, or 2, will be changed to inactive, or 0, because the maximum activated devices have been determined (second, third, and fourth devices in this example).

If step 416 is no, then flowchart 400 returns to step 402 to receive further activations from devices connected to network 102. In some instances, these activations will cycle through until step 412 determines that no random strings are left having a status of unknown. If step 412 is no, then step 420 executes by determining if the received random string has a status of inactive, or 0. An inactive device is one that is not currently allowed or specified to have access to content provider 103. For example, a device that is inactive may be sold or given to another customer that requires a new activation to access content provider 103. A status of inactive may be provided by customer 108. It also may be invoked in step 418 when determining the statuses of devices using their associated random strings.

If step 420 is no, then step 422 executes by returning to step 402. The status of the received random string is active. For example, fourth random string 202D includes a status 203D of active based on the example provided above. No further actions need to be taken so that the disclosed process may wait for the reception of additional credentials from other devices.

If step 420 is yes, then step 424 executes by sending a warning that an unauthorized access to content provider 103 may be occurring. A message may be sent to customer 108 at the associated email for account 116. A prompt may be displayed on the device associated with the received random string. Further, an alert may be sent to an administrator for content platform 103. Step 426 executes by locking account 116 from further access to content platform 103. Locking the account should prompt customer 108 to resolve the issue of possible piracy of its credentials. For example, customer 108 may not be aware of the access from the device noted as inactive. Content provider 103 can provide the devices currently listed as active to check against the devices belonging to customer 108.

FIG. 5 depicts a flowchart 500 for a random string check during a normal query run according to the disclosed embodiments. Flowchart 500 may refer to FIGS. 1-4 for illustrative purposes. Flowchart 500, however, is not limited to embodiments disclosed by FIGS. 1-4. During a normal query run, system 100 and content platform 103 may check to see if the random string associated with each device is the most recent random string for an activation for a particular account 116.

Query 501 is generated for use within flowchart 500. Query 501 includes authentication token 120, random string 113, and a request to content platform 103.

Step 502 executes by determining if the status is active or unknown for the random string in random string database table 122. If so, then authentication engine 118 will allow the entire query 501 to pass through using the process disclosed by flowchart 300. A query may refer to a particular request the device is making to the content engine including the authentication credentials 109 and the device's random string. In some instances, the query may relate to authentication token 120. Using flowchart 300, the random string at issue will be changed from unknown to active status.

If step 502 is not used, then step 504 executes by determining if no random string is associated with the order identification in random string database table 122. If so, then authentication engine 118 allows the query 501 to pass through to flowchart 300 and registers the random string in random string database table 122 as active. If necessary, Flowchart 300 also may change current active status for listed random strings to unknown, as disclosed above.

If steps 502 and 504 are not used, then step 506 executes by determining whether the query is associated with this particular random string. If not associated, then authentication engine 118 will allow the query to pass through and register the random string with a status of active using flowchart 300. The step also sends an alert or email to support for content provider 103 stating there is a potential piracy problem and to address this specific case.

If steps 502, 504, and 506 are not used, then step 508 executes by determining if the status of the random string is inactive. If so, then authentication engine 118 will not allow the query to pass through. Further, alerts and messages are sent that that maximum allowed activations for the license for account 116 have been reached. Customer 108 may deactivate the account on another device before activating it on the current device. Further, account 116 may be locked temporarily and automatically unlocked after a period of time, such as four hours to allow for any accidental activation to be resolved, or to upgrade the account to include additional devices. Alerts also may be sent to support about the possible piracy action.

Figure 6:
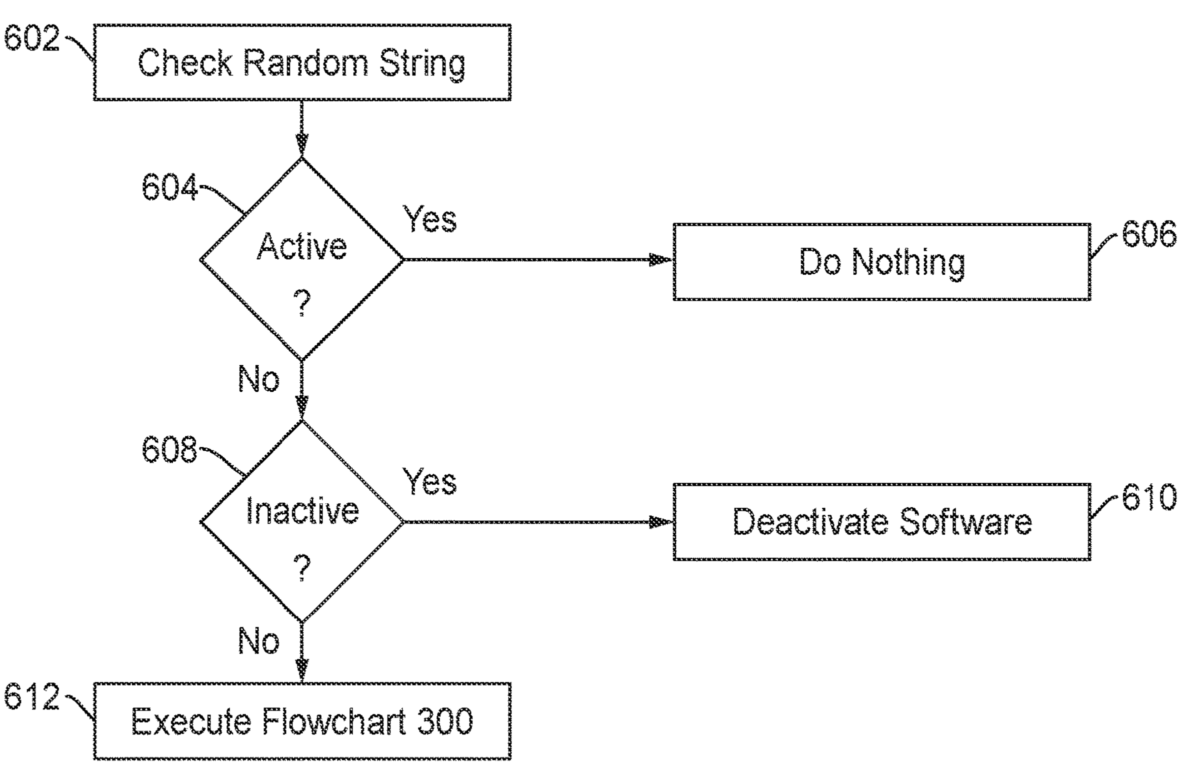
FIG. 6 illustrates a flowchart for a routine check of the statuses of random strings and their associated devices according to the disclosed embodiments.

FIG. 6 depicts a flowchart 600 for a routine check of the statuses of random strings and their associated devices according to the disclosed embodiments. Flowchart 600 may refer to FIGS. 1-5 for illustrative purposes. Flowchart 600, however, is not limited to the embodiments disclosed by FIGS. 1-5.

Step 602 executes by checking a random string. The disclosed embodiments may check on the status of random strings at the activated devices every so often, such as a set update schedule or when software updates at content platform 103. For example, authentication engine 118 may send requests for connected devices to send their current credentials including their associated random strings, or, in some embodiments, just the associated random strings. The disclosed embodiments receive each random string and perform the process disclosed below.

Step 604 executes by determining whether the random string has a status of active, or 1. If yes, step 606 executes by doing nothing further for the random string. If step 604 is no, then step 608 executes by determining whether the random string has a status of inactive. If yes, then step 610 executes by deactivating any associated software at the corresponding device. This feature may prevent future unauthorized access to content platform 103 or the possibility of pirating credentials from customer 108. If step 608 is no, then the random string most likely is not in random string database table 122, or may have a status of unknown. Step 612 executes by executing the process disclosed flowchart 300.

For example, authentication engine 118 performs the routine check as specified. The activated devices for customer 108 and account 116 are first device 114, second device 124, third device 126, and fourth device 128. Licensing engine 118 receives first random string 202A, second random string 202B, third random string 202C, and fourth random sting 202D and compares them to the random strings and corresponding statuses stored in random string database table 122.

Using this example, the disclosed embodiments determine that first random string 202A and third random string 202C have statuses of active, or 1. Thus, the disclosed embodiments take no further action with the entries in random string database table 122. Second random string 202B has a status 203B of inactive. The disclosed embodiments deactivate any software on second device 126. Fourth random string 202D is not found in random string database table 122, so the disclosed embodiments execute the process disclosed by flowchart 300 to activate this random string and its associated device.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed embodiments may be made without departing from the spirit or scope of the invention. Thus, it is intended that the present invention covers the modifications and variations disclosed above provided that these changes come within the scope of the claims and their equivalents.

The invention claimed is:

1. A method for activating a device to access a content platform, the method comprising:

receiving a plurality of credentials at an authentication engine from a plurality of devices connected to the content platform over a network, wherein each device is associated with a credential, and wherein the plurality of credentials and plurality of devices are associated with a user account, and the credentials include authentication components including a user name and a password for the user account and a random string generated at the respective device of the plurality of devices;

checking a random string database table for the random string;

if the random string has been stored in the random string database table, determining a status of an active device of the plurality of devices based on an entry in the random string database table, wherein the entry includes the random string for the active device associated with the user account and the credentials, and wherein each entry differs for each device of the plurality of devices; and activating the device of the plurality of devices to access the content platform based on the determination using the random string, wherein statuses for the plurality of devices are changed due to the activating, wherein for the user account, a predetermined number of devices of the plurality of devices are permitted to access the content platform at the same time, each of the predetermined number of devices generates a random string when registering with the content platform, and wherein the random string generated by each of the predetermined number of devices is stored in the random string database table and when a maximum activation number associated with the user account is reached for active devices of the plurality of devices accessing the content platform when an additional device is logged in and statuses of the predetermined number of devices are all activated, further comprising denying the additional device from accessing the content platform.

2. The method of claim 1, further comprising determining that the random string is not within the random string database table.

3. The method of claim 2, further comprising making the status for the random string active and storing the random string with the status in the random string database table.

4. The method of claim 3, further comprising changing a status for additional random strings within the random string database from active to unknown.

5. The method of claim 4, further comprising:

receiving a subsequent random string for another device at the authentication engine; and determining whether the subsequent random string is in the random string database table.

6. The method of claim 5, further comprising taking action with regard to the another device of the plurality of devices connected to the content platform based on the determination of a status of the subsequent random string.

7. The method of claim 1, when the maximum activation number associated with the user account is reached for active devices accessing the content platform when the additional device is logged in and at least one device has a status of unknown, further comprising:

changing the status of the at least one device from unknown to inactive; and activating the additional device for accessing the content platform.

8. A content provider providing contents to be used or viewed by at least one user, the content provider comprising:

a content platform receiving a plurality of credentials from a plurality of devices connected to the content platform over a network, wherein each device of the plurality of devices is associated with a credential of the plurality of credentials, and wherein the plurality of credentials and the plurality of devices are associated with a user account, and the credentials include authentication components including a a user name and a password for the user account and a random string generated at the respective device of the plurality of devices;

a database storing the user name, the password, and a random string database table having the random string for the user account;

a content database storing the contents to be sent to the at least one user associated with the user account;

one or more processors; and a memory coupled to the one or more processors, the memory including computer-readable instructions, which when executed, causes the one or more processor to:

authenticate the credentials received from the device to determine if the user name and password match with those saved in the database;

checking the random string database table for the random string;

if the random string has been stored in the random string database table, determining a status of the device of the plurality of devices based on an entry in the random string database table, wherein the entry includes the random string for the device and the credentials and wherein each entry differs for each device of the plurality of devices; and activating the device of the plurality of devices to access the content platform based on the determination using the random string, wherein statuses for the plurality of devices are changed due to the activating, wherein for the user account, a predetermined number of devices of the plurality of devices are permitted to access the content platform at the same time, each of the predetermined number of devices generates a random string when registering with the content platform, and wherein the random string generated by each of the predetermined number of devices is stored in the random string database table and when a maximum activation number associated with the user account is reached for active devices of the plurality of devices accessing the content platform when an additional device is logged in and statuses of the predetermined number of devices are all activated, further comprising denying the additional device from accessing the content platform.

9. The content provider of claim 8, wherein for the user account, a predetermined number of active devices of the plurality of devices are permitted to access the content platform at the same time, when requesting a connection with the content provider for the first time, each of the devices generating a random string together with the user name and the password to be sent to the content platform, and the random string of each of the plurality of devices is saved in the random string database table.

10. The content provider of claim 8, wherein the one or more processor further determines the random string is not within the random string database table.

11. The content provider of claim 10, wherein the one or more processor further makes the status for the random string active and storing the random string with the status in the random string database table.

12. The content provider of claim 11, wherein the one or more processor further changes a status for additional random strings within the random string database from active to unknown.

13. The content provider of claim 9, wherein the maximum activation number of the plurality of devices associated with the user account is reached for active devices accessing the content platform when the additional device is logged in and at least one active device has a status of unknown, further comprising:

changing the status of the at least one active device from unknown to inactivated; and activating the additional device for accessing the content platform.

* * * * *